United States Patent Office 3,672,730
Patented June 27, 1972

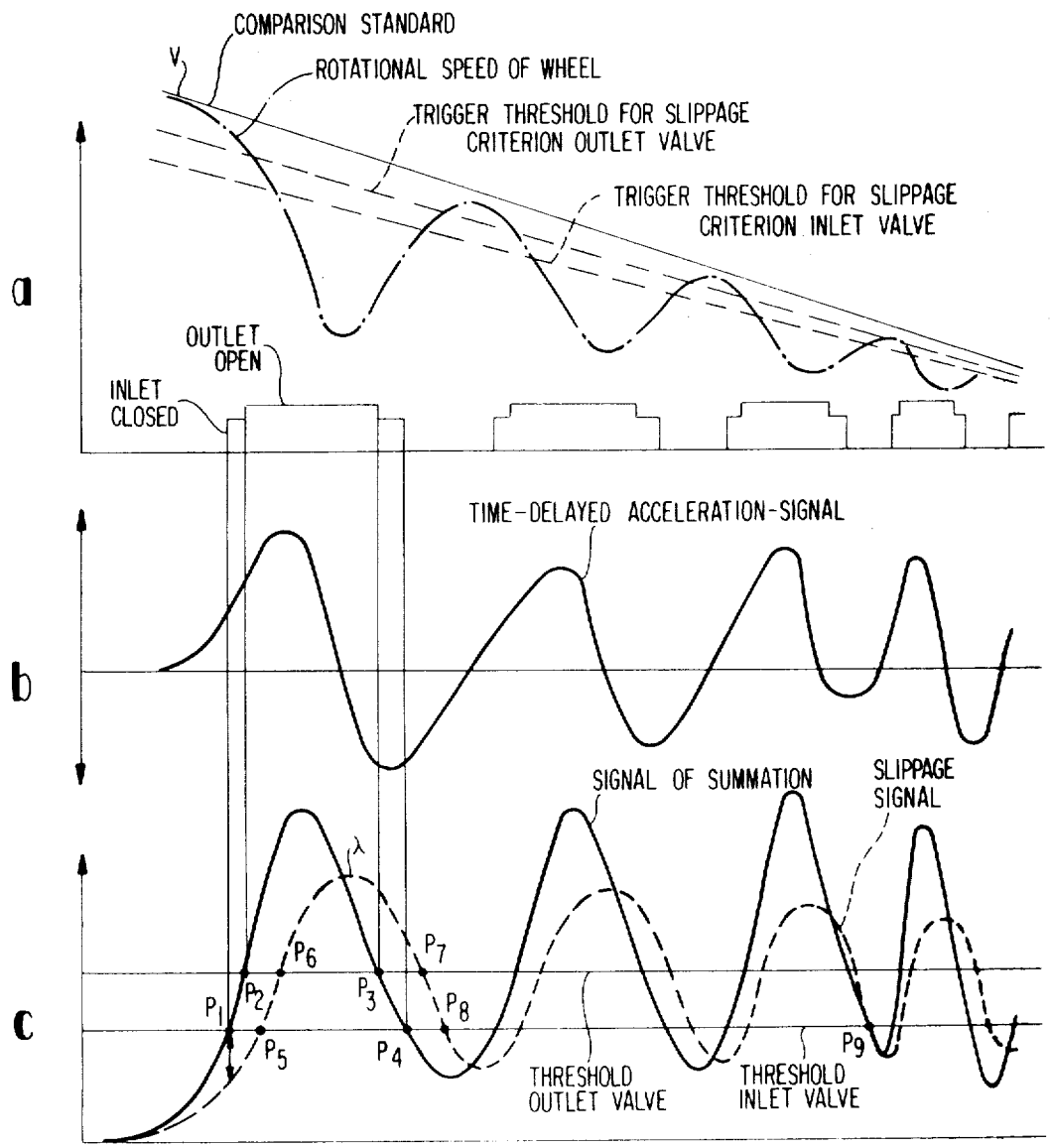

3,672,730
BRAKE FORCE CONTROLS SYSTEM FOR VEHICLES, ESPECIALLY MOTOR VEHICLES
Manfred H. Burckhardt, Waiblingen, Hans-Jorg Florus, Goppingen, Horst Grossner, Geradstetten, and Helmut Krohn, Esslingen-Liebersbronn, Germany, assignors to Daimler-Benz Aktiengesellschaft, Stuttgart-Unterturkheim, Germany
Filed June 22, 1970, Ser. No. 48,001
Claims priority, application Germany, June 25, 1969, P 19 32 128.9
Int. Cl. B60t 8/08, 8/12
U.S. Cl. 303—21 BE       32 Claims

ABSTRACT OF THE DISCLOSURE

A brake for control system for vehicles, particularly for motor vehicles in which a sensor is coordinated to each wheel for detecting its rotational condition; the sensor produces pulses when exceeding or falling below a predetermined threshold value which influences the brakes in accordance with both the wheel slippage and also the wheel acceleration, measuring magnitudes representing the slippage and the acceleration of a wheel being obtained from the sensors, preferably constructed as frequency generators and being combined into a signal magnitude representing the control pulse for the brakes.

Figure 1:
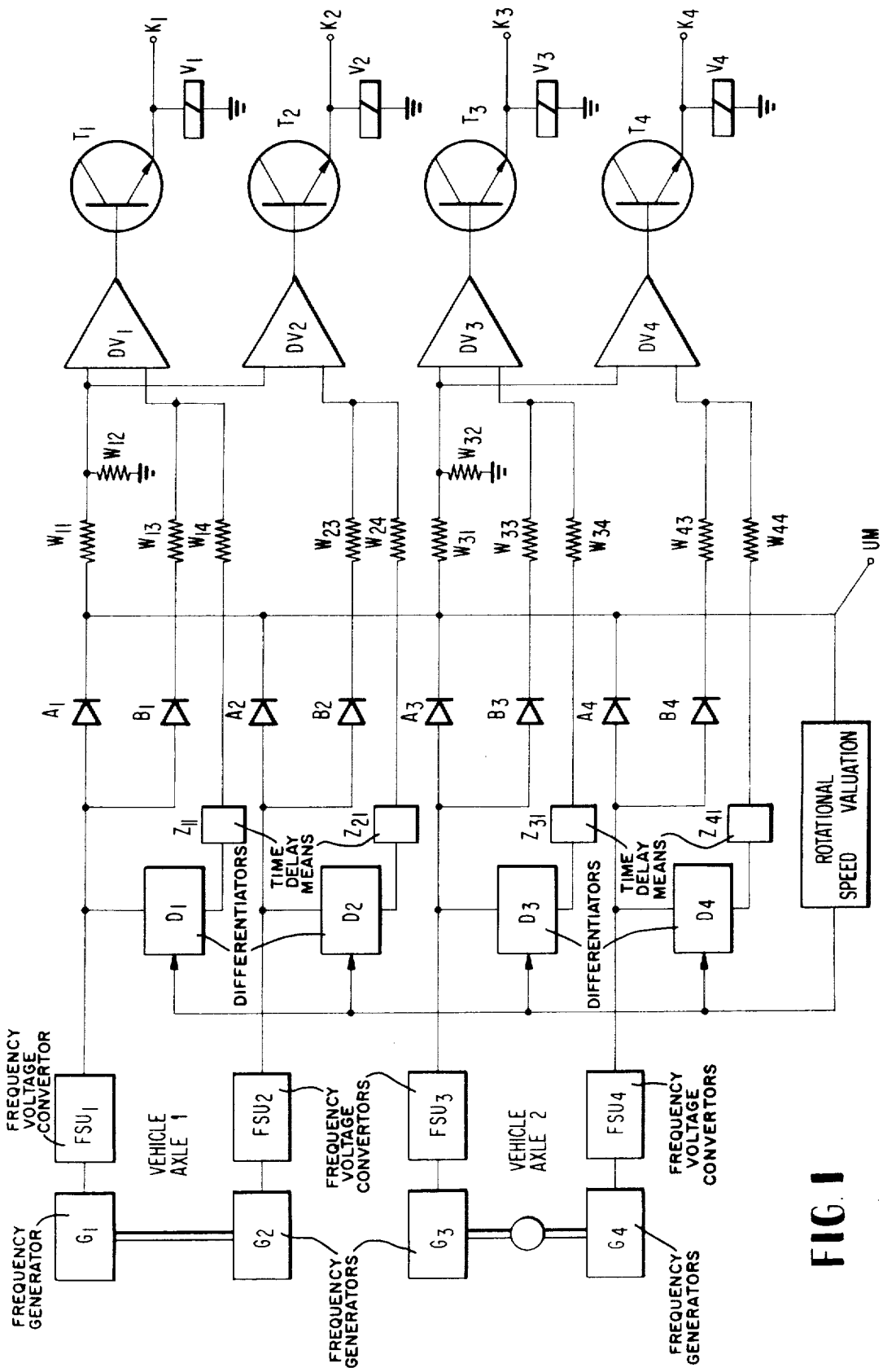

The present invention relates to a brake force control system for vehicles, especially for motor vehicles, whereby a sensor is coordinated to each wheel for determining its rotational condition, whose pulse influences the brakes when exceeding or falling below a predetermined threshold value.

Brake force control systems of the aforementioned type are known as such. They have the purpose to so control the brake moment that the maximum force adapted to be transmitted between wheel and road is utilized. It is thus assured that for emergency braking operations, the shortest brake path is achieved. Essentially two methods are known in that connection whereby in the first method one starts with the slippage of the wheel (slippage control system) and in the second with the acceleration of the wheel (acceleration control system). Both prior art methods entail the common disadvantage that they operate satisfactorily only for very certain driving conditions, for which the adjustment of the control device has been designed. It is not possible to detect and exploit in an optimum manner all occurring load conditions of the vehicle wheel such as, for example, alternating brake force coefficient, curve velocities, braking in the curve, by one of the two methods alone. Therebeyond, the following disadvantages result in particular:

Since the exact comparison of rotational speed-driving velocity can hardly be realized in practice, one resorts with the "slippage control system" to the expedient that one compares the rotational speeds of the individual wheels with each other and utilizes as comparison standard the rotational speed of the wheel rotating fastest. The application of such a brake slippage control system is impaired:

(1) By the response delay of the adjusting or actuating members which can be traced back in general to the limited flow quantity of the brake fluid per unit time on the inside of the adjusting or actuating members;

(2) By the available brake medium quantity which limits the number of the control cycles; and (3) By the location of the optimum brake slippage dependent on the velocity, on the matching of road to tire, on the environment and on the driving condition. This fluctuates in such a manner that a generally valid intended value cannot be predetermined.

For the detecting of the wheel acceleration, one utilizes for the most part inert masses in connection with the "acceleration control system," by means of which electric switches are actuated. Disadvantageous with this system is the fact that accelerations which stem from the driving, for example, shocks caused by an uneven road surface, as well as the rotary or angular accelerations stemming from changes in the roll radius cannot be fully utilized and exploited. However, they may nonetheless cause a response in case the response threshold is not selected large enough. There exists the danger with the thresholds required thereby that a wheel may nonetheless become eventually locked slowly, i.e., with a deceleration below the response threshold. According to the principle of such systems, a positive acceleration threshold is to signal the entry of the wheel into the re-acceleration phase during the pressure decrease initiated by the deceleration signal. The pressure decrease is then stopped upon reaching this threshold. If now during the pressure decrease a sufficient re-acceleration does not take place, for example, with a small friction value on slippery ice or during aqua-planing, then the signal for the decrease of the pressure is no longer cancelled or annulled. The wheel brake is therefore without pressure and does not transmit any longer any brake force during the further braking operation. Such a system does not assure under all driving and road conditions the aimed-at shortest brake path and locking-free wheels.

The present invention is concerned with the task to avoid the aforementioned disadvantages. Consequently, the present invention is principally intended to provide a brake force control system by means of which the consideration of the changing conditions is possible at least approximately.

The underlying problems are solved with the brake force control system of the aforementioned type in accordance with the present invention in that frequency generators are used as sensing devices, by means of which both the wheel slippage as also the wheel acceleration can be detected, and in that the two measuring magnitudes representing the slippage and the acceleration are combined into a signal magnitude representing the control pulse for the brakes. By the term, "wheel slippage" is meant herein the deviation of the wheel rotational speed from a comparison standard; namely, the rotational speed of the wheel rotating fastest. Preferred in connection with the present invention is a realization, in which a frequency-voltage-converter is coordinated to each frequency generator and in which a first voltage corresponding to the wheel acceleration is added to a second voltage corresponding to the wheel slippage, and the thus-obtained third voltage serves as signal magnitude.

The described disadvantages can be avoided by the present invention as will become more apparent in particular from the following explanation. The present invention produces in particular a greater response sensitivity, and it is achieved thereby that with a slow decrease of the wheel rotational speed (weak acceleration signals), the control is actuated by the slippage signals and thus a locking of the wheel is avoided in every case. Furthermore, it is not necessary to achieve a predetermined re-acceleration value in order to terminate the pressure decrease in the brake cylinder.

A further feature of the present invention resides in that the first voltage is added to the second voltage in a predetermined ratio which may possibly also be adjustable. As a result thereof, the sum of the voltages, i.e., the additively combined voltage serving as signal magnitude reaches the required threshold values earlier. The brake force distribution installed in the vehicle may be taken into consideration by the design and selection of the ratio of the two voltages for the vehicle axles. According to a further feature of the present invention, it may be of advantage if the proportion of the first voltage becomes smaller with decreasing wheel velocity which may be achieved by conventional means.

It is further proposed by the present invention that the first voltage be added to the second voltage after a predetermined, possibly adjustable time delay. The magnitude of this time delay decreases with an increasing first voltage (integral behavior). It is achieved thereby that the acceleration signals first have to await a predetermined time before they are utilized. In connection therewith, it is additionally proposed that the time delay is larger in the rotational speed decrease phase of the wheel than in the rotational speed increase phase of the wheel.

According to the present invention, the prevailing maximum wheel rotational speed or a magnitude corresponding to this maximum wheel rotational speed serves as comparison standard for the wheel slippage.

A further feature of the present invention resides in that the frequency generators are each connected with a corresponding frequency-voltage converter which are all connected together by way of diodes at one point for the formation of the maximum voltage (comparison voltage).

Furthermore, each frequency voltage converter is connected with a conventional differentiator which, in its turn, is connected with the maximum voltage point for the rotational speed evaluation. A conventional delay element is connected in the output of each differentiator which undertakes the time-delay dependent on acceleration. It is thereby further proposed that the voltage prevailing at the maximum voltage point be divided by resistances in the ratio of the desired response rotational speed and the partial voltage is adapted to be fed for the purpose of comparison to the differential amplifiers coordinated according to the present invention to the magnetic or solenoid valves.

It is additionally proposed that each frequency voltage converter be connected directly by way of diodes and resistances with the second input of the associated differential amplifier in by-passing relationship of the maximum voltage point. For the purpose of summation, the output of each differentiator is then connected according to the present invention by way of a delay element and resistance with the second input of the associated differential amplifier. The output of each differential amplifier controls according to the present invention by way of a line transistor the magnetic valve or the corresponding magnetic valves in the associated brake circuit.

Accordingly, it is an object of the present invention to provide a brake force control system for vehicles, especially motor vehicles which avoids by simple means the aforementioned shortcomings and drawbacks encountered in the prior art.

Another object of the present invention resides in a brake force control system for vehicles which operates completely satisfactorily under all driving conditions, yet takes into consideration substantially all occurring conditions of the vehicle wheel.

A further object of the present invention resides in a brake force control system for motor vehicles which is simple in construction and reliable in operation to assure a minimum brake path under all conditions.

A still further object of the present invention resides in a brake force control system for motor vehicles which avoids with certainty the locking of any wheel, yet assures the shortest brake path for a given braking operation.

These and further objects, features, and advantages of the present invention will become more obvious from the following description when taken in connection with the accompanying drawing which shows, for purposes of illustration only, one embodiment in accordance with the present invention, and wherein:

FIG. 1 is a schematic block diagram of a brake force control system in accordance with the present invention; and FIGS. 2a, b and c are explanatory diagrams of the operation of the brake force system in accordance with the present invention.

The slippage value, as known, is determined from the ratio of two rotational speeds and is therefore independent of the absolute magnitude of the rotational speeds. In the instant case, the response criterion for the slippage is formed in that a comparison of the prevailing wheel rotation speed with a predetermined portion of the maximum rotational speed (rotational speed of the wheel rotating fastest) is carried out. While it is true that the response threshold at each velocity remains thereby at the same ratio to the maximum rotational speed, the absolute value of the difference of the two rotational speeds is nonetheless rotational-speed-dependent, i.e., it decreases with decreasing rotational speed. If now an acceleration component is to be superimposed on the rotational speed difference, then this acceleration signal has to be weighted in a rotational-speed-dependent manner, i.e., a rotational speed dependent value has to be assigned to this acceleration signal.

The construction of such a control system is illustrated in block diagram in FIG. 1 for the control of the inlet valves of the brake circuits. For the separate control of the outlet valves of the same brake circuits, level switches (differential amplifiers or comparators DV) and valve controls are additionally provided once more which, however, for reasons of clarity, have not been illustrated. Both inlet and outlet valves can be controlled in parallel by an electronic control system according to FIG. 1 or can also be replaced by a conventional shifting valve replacing the inlet and outlet valves. The rotational speed information is so formed by way of the frequency generators $G_1$ to $G_4$ serving as transmitter and the conventional frequency-voltage-converters $FSU_1$ to $FSU_4$ that a voltage results proportional to the rotational speed. All of the voltages corresponding to the rotational speed are connected together by way of diodes $A_1$ to $A_4$ at the point UM for producing the maximum voltage. This maximum voltage is divided in the ratio of the desired response-rotational speed condition for the vehicle axle 1 by the resistances $W_{11}$ and $W_{12}$ and the partial voltage is fed for the purpose of comparison to a first input of the differential amplifiers (comparators) $DV_1$ and $DV_2$. In an analogous manner, the partial voltage is formed by resistances $W_{31}$ and $W_{32}$ for the vehicle axle 2 and is transmitted to the differential amplifiers (comparators) $DV_3$ and $DV_4$. Additionally, the voltages corresponding to the rotational speed are applied by way of diodes $B_1$ to $B_4$ and resistances $W_{13}$ to $W_{43}$ to the second input of the corresponding differential amplifiers $DV_1$ to $DV_4$. In this manner, one thus obtains a rotational speed comparison and a signal which corresponds to the slippage of each wheel.

The acceleration signal of a wheel, which is to be superimposed, is realized from the rotational speed signal thereof, i.e., by the fact that the voltage corresponding to the rotational speed is differentiated in the differentiators $D_1$ to $D_4$, respectively. The thus-obtained acceleration signal is influenced by a rotational speed valuation or weighting so that a rotational-speed-corrected voltage dependent on acceleration is available at the output of the differentiator. This voltage is added by way of a conventional delay element $Z_{11}$, $Z_{21}$, $Z_{31}$ and $Z_{41}$ and by way of a resistance $W_{14}$, $W_{24}$, $W_{34}$ and $W_{44}$, connected to the second input of the corresponding differential amplifier $DV_1$, $DV_2$, $DV_3$ and $DV_4$, respectively, to that voltage which was obtained from the rotational speed of the corresponding wheel.

The rotational speed valuation or weighting provides a weighting, for example, a multiplication of the acceleration value with the maximum wheel velocity realized by conventional means. The multiplication factor, however, need not be proportional to the wheel velocity but for purposes of better optimization may be realized in a nonlinear manner. This valuation can be realized in any conventional manner, known as such, for example, by electrical impedances such as by magnetic-field sensitive impedances, by voltage-sensitive impedances, or by light-sensitive impedances (ohmic, inductive or capacitive impedances), by a level adjustment of conventional type or according to the time division method. With the latter, only the pulses of equal duration from the frequency voltage converter FSU need to be influenced in their amplitude by the maximum voltage. The mutual matching of acceleration and slippage signal may, of course, also take place by influencing the slippage signal in any conventional manner.

The output of each differential amplifier $DV_1$ to $DV_4$ controls by way of a line transistor $T_1$ to $T_4$ the corresponding magnetic valve in the associated brake circuit. An actuation of the magnetic valve takes place when the voltage at the input, where the signal of summation is applied, is smaller than the divided maximum voltage at the other input of the differential amplifier.

The physical progress of such a control is illustrated in FIGS. 2a to 2c. In the upper diagram 2a, the uppermost straight line V represents the curve of the maximum voltage, i.e., so to speak of, the rotational speed of the wheel rotating fastest. The dash lines are the response thresholds (trigger thresholds) for the pure slippage criterion. For the sake of simplicity, it is assumed that only one wheel has a tendency to lock, i.e., its rotational speed signal differs from the maximum voltage, as indicated in FIG. 2a by the dash and dot line representing the wheel rotational speed thereof. The associated time-delayed acceleration signal of this wheel is plotted in the center diagram 2b. The dash line in the lower diagram 2c represents the slippage signal of the wheel. The full line in diagram 2c represents the sum of the signals of the slippage and time-delayed acceleration signal. The threshold values for the actuation of the inlet and outlet valves (not shown), which are provided for each brake circuit in a conventional manner, are shown in the diagram 2c parallel to the zero line. The control progress of the valves is visible from the upper diagram 2a. The operation of the control takes place in the following manner:

With increasing reduction in the wheel rotational speed (see FIG. 2a), both the slippage (see FIG. 2c) as also the negative time-delayed deceleration (see FIG. 2b) increase. The signal of summation (FIG. 2c) therefore reaches at $P_1$ the threshold value for the inlet valve which is actuated at this moment, i.e., is closed. The closing of the inlet valve effects that the pressure in the brake cylinder of the wheel cannot increase any more. Since, however, the wheel continues to be decelerated, also the second threshold for the outlet valve is surpassed by the signal of summation at $P_2$ and thus also the outlet valve is actuated, i.e., is opened. As a result thereof, the brake pressure at the wheel is decreased, and more particularly for such length of time until a re-acceleration phase of this wheel starts. This is expressed in a reduction of the signal of summation so that at $P_3$ the signal of summation drops below the threshold of the outlet valve and the latter therefore closes again so that no further pressure decrease takes place. After dropping below the inlet valve threshold at point $P_4$, and therewith after reopening of the inlet valve which occurs thereat, the pressure in the brake of the wheel increases again.

The illustrated arrangement possesses by the superimposition of the acceleration signal, the advantage of greater responce sensitivity in the dynamic case. If the superimposed acceleration were not present, then the control would start later. In the illustrated example, the inlet valve would be closed for the first time at point $P_5$ and the outlet valve would be opened at the point $P_6$. During the rotational speed increase phase of the wheel, the corresponding points would be located at $P_7$ and $P_8$. Another advantage of this method compared to a pure acceleration control resides in that with a slow decrease of the wheel rotational speed, where the acceleration signals are very weak, the control is realized alone by the slippage signal. A locking of the wheel is thus prevented in every case. Similarly, it is not necessary that a predetermined re-acceleration value has to be attained in order to stop the pressure decrease in the braek cylinder. Even if no re-acceleration occurs, for example, with aqua-planing, the decrease of the slippage signal below the response values would suffice in order to enable a renewed pressure build-up and therewith further control cycles. If, as during the third illustrated control cycle, a relatively slow acceleration occurs, then the curve of the signal of summation approaches the pure slippage signal and at point $P_9$ (FIG. 2c) drops below the threshold for the actuation of the inlet valve. A conventional safety installation is co-ordinated to the illustrated brake force control system. The safety installation has the purpose to monitor and supervise the functioning of the control system. In case of failure—also of its own failure, the control system is to be rendered inoperable in such a manner that the vehicle brakes are operational in a normal manner.

This safety installation is constructed as an electrical logic circuit. The control signals of the valves which in the embodiment according to FIG. 1 exist at the points $K_1$ to $K_4$ (and also those control signals of the outlet valves not shown), may be utilized for the supervision and monitoring of the installation. If all sensing devices and the control apparatus are in proper order, then none of the points $K_1$ to $K_4$ has a potential. If a control takes place during a braked drive, then the valves are controlled. Corresponding to the frequency of the control cycle, this control is of relatively short duration. If a continuous potential exists at one of the points $K_1$ to $K_4$, then this indicates a failure or error in the installation. This criterion is utilized by the safety logic circuit for turning off the installation, for example, for turning off the current supply to the magnetic valves.

A turning-off of the installation after the commencement or start of a braking operation may also lead to critical driving conditions. Hence, a monitoring is necessary already during the unbraked drive. Since the installation operates independently of the actuation of the brakes, a continuous monitoring can be realized according to the principle described above.

It may be prevented by appropriate measures of any conventional type that the safety installation also responds in case of an excessively large driving slippage of one or several wheels. For example, the simultaneous presence of a potential at the valves of the non-driven wheels with a non-actuated brake may be utilized for the logic decision in that case.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A brake control system for the brakes of vehicles, in which a sensing means which is coordinated to a respective wheel for determining its rotational condition, influences the brakes when a predetermined threshold value is exceeded or dropped below, characterized in that each sensing means includes frequency generator means operable to detect the wheel speed, a frequency voltage converter means being coordinated to each frequency generator means and providing measuring magnitudes representing wheel slippage and wheel acceleration in the form of a first voltage corresponding to the wheel acceleration and a second voltage corresponding to the wheel slippage and means for additively combining said first and second voltages to provide a third voltage which serves as a control signal for the brakes.

2. A brake force control system according to claim 1, characterized in that the first voltage is added to the second voltage in a predetermined ratio.

3. A brake force control system according to claim 2, characterized in that said ratio is adjustable.

4. A brake force control system according to claim 2, characterized in that the proportion of the first voltage becomes smaller with decreasing wheel velocity.

5. A brake force control system according to claim 4, characterized in that the first voltage is added to the second voltage after a predetermined time delay whose magnitude decreases with increasing first voltage.

6. A brake force control system according to claim 5, characterized in that said time delay is adjustable.

7. A brake force control system according to claim 5, characterized in that the time delay is larger during the rotational speed decrease phase of the wheel than during the rotational speed increase phase of the wheel.

8. A brake force control system according to claim 7, characterized in that a magnitude corresponding to the highest wheel rotational speed serves as comparison standard for the wheel slippage.

9. A brake force control system according to claim 8, characterized in that each frequency generator means is connected with the frequency voltage converter means, all of said frequency voltage converter means including frequency voltage converters being operatively connected by way of diodes with one point for forming the maximum voltage representing the speed of the fastest wheel and in that each freqeuncy voltage converter is operatively connected with a differentiator means which, in its turn, is operatively connected with said point for a rotational speed valuation.

10. A brake force control system according to claim 9, characterized in that the voltage existing at said point is subdivided in the ratio of the desired response rotational speed and a resultant partial voltage is fed for the purpose of comparison to a differential amplifier means coordinated to a magnetic valve means.

11. A brake force control system according to claim 10, characterized in that each frequency voltage converter is operatively connected with the second input of the associated differential amplifiers means directly by way of diodes and resistances and in by-passing relationship of said maximum voltage point.

12. A brake force control system according to claim 11, characterized in that the output of each differentiator means is operatively connected by way of delay means and resistance means with the second input of the associated differential amplifier means.

13. A brake force control system according to claim 12, characterized in that the output of each differential amplifier means controls by way of a line transistor means the corresponding magnetic valve means in the coordinated brake circuit.

14. A brake force control system according to claim 13, characterized in that the response threshold for an inlet valve means amounts to about 40% of the maximum voltage representing the speed of the fastest wheel.

15. A brake force control system according to claim 14, characterized in that the response threshold for an outlet valve means amounts approximately to 50% of the maximum value representing the speed of the festest wheel.

16. A brake force control system according to claim 15, characterized in that the first voltage is added to the second voltage in such a manner that a slippage of about 20% corresponds to a superimposed acceleration component of 1 g./m.

17. A brake force control system according to claim 7, characterized in that the prevailing maximum wheel rotational speed serves as comparison standard for the wheel slippage.

18. A brake force control system according to claim 4, characterized in that the first voltage is added to the second voltage after a predetermined time delay whose magnitude decreases with increasing first voltage.

19. A brake force control system according to claim 18, characterized in that said time delay is adjustable.

20. A brake force control system according to claim 18, characterized in that the time delay is larger during the rotational speed decrease phase of the wheel than during the rotational speed increase phase of the wheel.

21. A brake force control system according to claim 1, characterized in that the proportion of the first voltage becomes smaller with decreasing wheel velocity.

22. A brake force control system according to claim 1, characterized in that the prevailing maximum wheel rotational speed serves as comparison standard for the wheel slippage.

23. A brake force control system according to claim 1, characterized in that a magnitude corresponding to the highest wheel rotational speed serves as comparison standard for the wheel slippage.

24. A brake force control system according to claim 23, characterized in that the response threshold for an inlet valve means amounts to about 40% of the maximum voltage representing the comparison standard.

25. A brake force control system according to claim 24, characterized in that the response threshold for an outlet valve means amounts approximately to 50% of the maximum value representing the comparison standard.

26. A brake force control system according to claim 23, characterized in that the response threshold for an outlet valve means amounts approximately to 50% of the maximum value representing the comparison standard.

27. A brake force control system according to claim 1, characterized in that each frequency generator means is connected with the frequency voltage converter means, all of said frequency voltage converter means including frequency voltage converters being operatively connected by way of diodes with one point for forming the maximum voltage representing the speed of the fastest wheel, and in that each frequency voltage converter is operatively connected with a differentiator means which, in its turn, is operatively connected with said point for a rotational speed valuation.

28. A brake force control system according to claim 27, characterized in that the voltage existing at said point is subdivided in the ratio of the desired response rotational speed and a resultant partial voltage is fed for the purpose of comparison to a differential amplifier means coordinated to a magnetic valve means.

29. A brake force control system according to claim 28, characterized in that each frequency voltage converter is operatively connected with the second input of the associated differential amplifier means directly by way of diodes and resistances and in by-passing relationship of said maximum voltage point.

30. A brake force control system according to claim 28, characterized in that the output of each differentiator means is operatively connected by way of delay means and resistance means with the second input of the associated differential amplifier means.

31. A braek force control system according to claim 28, characterized in that the output of each differential amplifier means controls by way of a line transistor means the corresponding magnetic valve means in the coordinated brake circuit.

32. A brake force control system according to claim 1, characterized in that the first voltage is added to the second voltage in such a manner that a slippage of about 20% corresponds to a superimposed acceleration component of 1 g./m.

References Cited

UNITED STATES PATENTS

| | | | |
|---|---|---|---|
| 3,245,213 | 4/1966 | Thompson et al. | 303—21 EB |
| 3,494,671 | 2/1970 | Slavin et al. | 303—21 P |
| 3,556,611 | 1/1971 | Howard | 303—21 P |
| 3,260,555 | 7/1966 | Packer | 303—21 EB |
| 3,482,887 | 12/1969 | Sheppard | 303—21 BE |

MILTON BUCHLER, Primary Examiner

S. G. KUNIN, Assistant Examiner

U.S. Cl. X.R.

188—181 C; 303—20, 21 P, 21 AF